Dec. 5, 1967     C. M. MARSHALL ETAL     3,356,246
TELESCOPING ROD CASE WITH SLIDING CAM LOCK
Filed April 27, 1965

INVENTORS.
CHARLES M. MARSHALL
KENNETH MC CULLOUGH
BY
*Oldham & Oldham*
ATTYS.

United States Patent Office 3,356,246
Patented Dec. 5, 1967

3,356,246
TELESCOPING ROD CASE WITH SLIDING CAM LOCK
Charles M. Marshall and Kenneth McCullough, Kent, Ohio, assignors to D & G Plastics Company, Kent, Ohio
Filed Apr. 27, 1965, Ser. No. 451,145
6 Claims. (Cl. 220—8)

ABSTRACT OF THE DISCLOSURE

A two-part telescoping rod case provided with a sliding cam lock to limit the telescopic movement of a first container section with respect to a second container section. In essence, the sliding cam lock is a wedge that fits in complementary relationship to a tapered recess on the internal surface of the outer case, and when moved linearly out of complementary relationship wedges itself between the two container sections to in effect lock them into non-sliding relationship to each other.

---

This invention relates to a two-part telescoping rod case with a sliding cam lock to limit the telescopic movement of a first container section with respect to a second container section.

Heretofore it has been known that there have been various types of telescoping cases used for many different purposes. For example, a telescoping case shown in Patent No. 2,143,720 deals with a case for fishing rods, while Patent No. 2,803,322 simply illustrates a telescopic carrying case. Of course, the nice feature of cases of this type is their adjustable length to allow for carrying articles of varying lengths, or for other suitable or adjustable purposes. However, such adjustability requires a flexible locking means between the tube cases in their adjusted position. The prior art locking means have not proved to be entirely satisfactory, or have been too expensive, complicated, or have simply not properly performed the locking function.

Therefore, it is the general object of the present invention to avoid and overcome the foregoing and other difficulties of and objections to prior art practices by the provision of a telescoping tubular case which utilizes a sliding wedge for positively locking the cases relative to each other at a desired adjusted position.

A further object of the invention is to provide telescoping tubular case members with a sliding cam lock comprising an arcuate shaped wedge received in sliding complementary relationship in an eccentric recess in one of the members whereby sliding movement of said wedge in a receiving recess effectively locks the telescoping members in adjusted position.

A further object of the invention is to provide a simple, highly effective, inexpensive slide cam lock for an attractive, durable telescoping tubular container unit.

The aforesaid objects of the invention and other objects which will become apparent as the description proceeds are achieved by providing in a telescopic carrying case the combination of a first tubular container having an eccentric internal recess, a second tubular container telescopically received within the first container, and an arcuate wedge received in sliding complemental relation to the recess of the first container whereby sliding of the wedge out of complementary relation with the recess limits the telescopic movement of the first container with respect to the second container and locks the containers in a given relationship.

For a better understanding of the invention, reference should be had to the accompanying drawings wherein.

Figure 1:
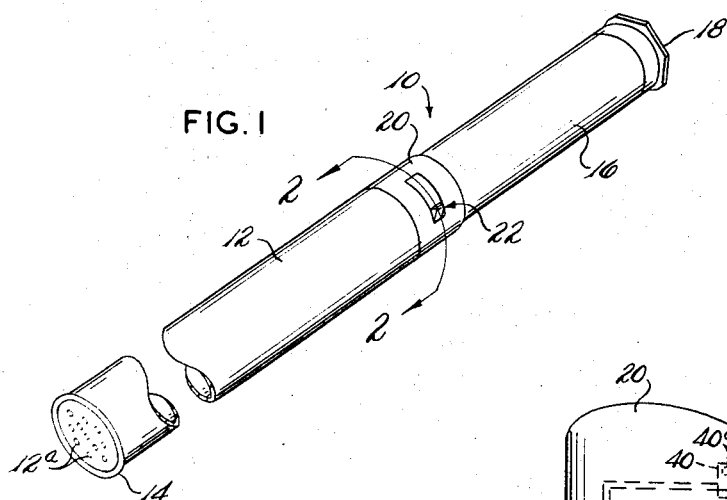
FIGURE 1 is a broken away perspective view of a telescopic tubular container employing the slide cam lock features of the invention.

While it should be understood that the principles of the invention are applicable to telescoping cases of any cross sectional design, the principles are most applicable to a tubular telescopic case, and hence it has been so illustrated and will be so described.

With reference to the form of the invention illustrated in the drawings, the numeral 10 indicates generally a tubular carrying case comprising a first tubular outer container 12 having a closed end 14 telescopically receiving a second tubular container 16 having a closed end 18. Of course, normal breathing holes 12a may be provided in the closed end 14 of the container 12. The first tubular container 12 has fixedly secured thereto a strengthening or reinforcing cap, or collar 20 protecting and strengthening its open end. A sliding cam lock, indicated generally by the numeral 22, is provided and preferably is positioned in the cap 20 for locking the container 12 and 16 in fixed relation to each other when they have been appropriately adjusted for the desired length. The closed ends 14 and 18 usually are provided by separate members suitably attached to the respective containers. The cap 18 can be threadably engaged with the container 16 to facilitate loading and unloading of the case 10. Preferably the components of the carrier case are all made from suitable plastics by extrusion or molding action to provide a sturdy but inexpensive case from a few parts that can be readily secured together. The reinforcing cap or band 20 is suitably secured to the first container 12 but may be made as a unit therewith if desired.

Figure 2:
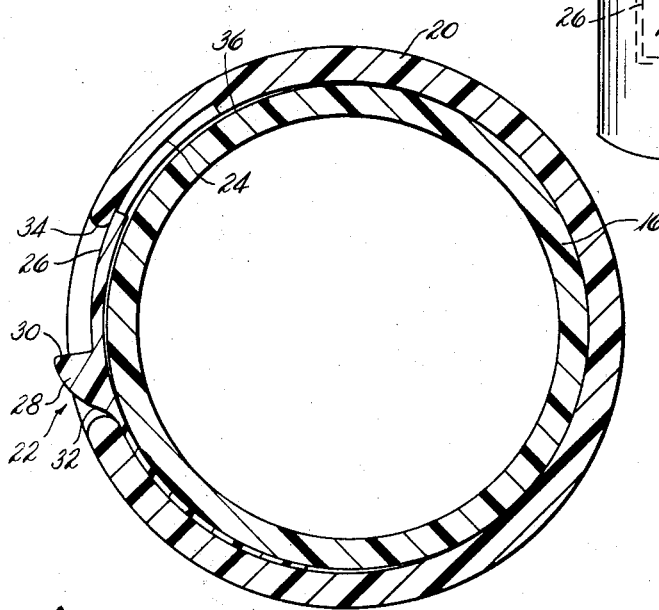
FIGURE 2 is an enlarged cross sectional view of the slide cam lock in the locked position taken on line 2—2 of FIGURE 1.

In order to understand the features of the cam lock 22, reference should be had to FIGURE 2 wherein it is seen that the cap 20 contains an eccentric recessed groove 24 adapted to receive, in complementary relationship, an arcuate shaped wedge or cam 26. The longitudinal axis of the recessed groove 24 is substantially parallel to the open end of the cap 20 and extends about 120° or more around the internal circumference thereof. The wedge or cam 26 is adaptable for sliding movement relative to the recess 24 by means of a radially outwardly extending tab projection 28. It should be noted that the projection 28 has a radially directed side 30 toward the thicker portion of the wedge 26 while the projection 28 is more gently tapered at 32 towards the thinner portion of the wedge 26. The projection 28 is received through an elongate substantially rectangularly shaped opening 34 extending radially through the strengthening cap 20 and substantially centrally located with respect to the recess 24 for a short arcuate distance around the circumference thereof.

FIGURE 2 illustrates the wedge or cam 26 in the locking position where it can be seen that the internal tubular container 16 has been forced into a wedged locking relationship relative to the strengthening cap 20 by the sliding action of the wedge 26 out of complementary relationship with the eccentric recessed groove 24. Notice that some clearance exists between the containers and that a gap at 36 is caused by the wedging or locking action of the wedge or cam 26 as it is slidably moved out of complementary relationship with the groove 24. Also, it should be noted that an additional cam locking action may be obtained because the tapered surface 32 of the projection 28 tends to engage with the defining surface of the opening 34 causing a further displacement of the wedge 26 and an increasing locking action between the tubular container 16 and the strengthening band 20. This additional locking action is not necessary in most instances.

Figure 3:
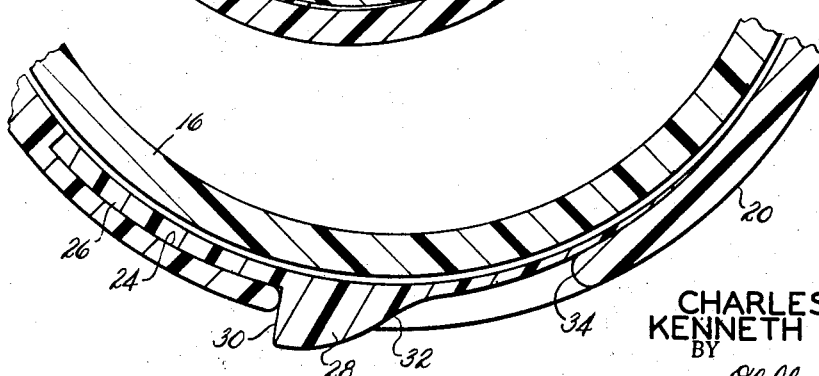
FIGURE 3 is a further enlarged broken away view of the slide cam lock in the unlocked position.

FIGURE 3 illustrates the complementary relationship of the wedge 26 relative to the recessed groove 24 showing that in such complementary relationship the arcuate shape of the wedge 26 essentially continuously defines the internal circumference of the strengthening cap or band 20. The invention contemplates that the projection 28 will be substantially centrally positioned relative to the wedge 26 with the length of the opening 34 allowing sufficient sliding movement of such wedge by the projection 28 to cause the desired locking action. Also, it should be noted that neither end of the wedge 26 will be exposed in the opening 34 on the full sliding movement of the projection in the opening 34.

Figure 4:
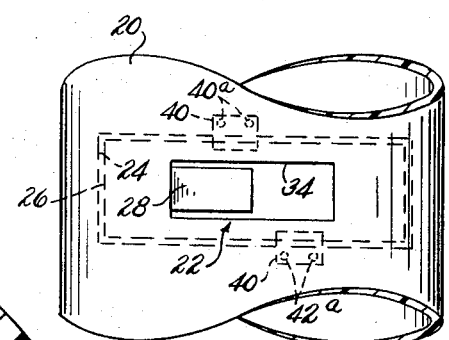
FIGURE 4 is a broken away side view showing the relative size of the slide cam lock with respect to the actuating hole through the tube casing.

FIGURE 4 illustrates that the wedge 26, indicated by dotted lines, will normally be much wider than the projection 28 which is received through the opening 34. Also, the close fitting complementary relationship of the wedge 26 to the recess 24 should be noted in FIGURE 4.

If one desired to hold the wedge 26 in position relative to the recess 24 upon the removal of the tubular container 16, suitable spring metal retaining clips 40 and 42 may be appropriately received in recessed relationship relative to the strengthening cap 20 and mounted by suitable means such as rivets 40a and 42a, respectively, as seen in FIGURE 4.

Thus, it is seen that the objects of the invention have been achieved by providing a simple sliding wedge or cam received in complementary relationship in an eccentric recessed groove associated with a strengthening collar or cap on the top of the outer tubular container of a telescoping tubular case. Simple sliding action of the wedge achieves the desired locking function by securely wedging the container sections together. Such wedging action can be enhanced by creating a taper on the projection effecting movement of the wedge.

While in accordance with the patent statutes, only one best known embodiment of the invention has been illustrated and described in detail, it is to be particularly understood that the invention is not limited thereto or thereby, but that the inventive scope is defined in the appended claims.

What is claimed is:

1. In a telescoping tubular container the combination of
    a first tube closed at one end, said tube having an eccentric recessed groove extending partially around the internal circumference thereof in adjacent parallel relation to the open end of the first tube, and an extended substantially rectangular hole through the wall of said tube substantially smaller than and centrally positioned with respect to the recessed groove,
    a second tube closed at one end having the other end receivable in telescoping relation into the open end of the first tube, at least one of said tube closed ends having vent openings therein,
    an arcuate shaped wedge fitting in sliding complementary relation with said recessed groove, and
    means extending through said hole operatively engaging said wedge to effect circumferential movement thereof relative to both tubes whereby both tubes are wedged into a locked relation to each other.

2. In combination
    a first tube closed at one end and having an internal eccentric recess adjacent and substantially parallel to the open end extending around at least a portion of the internal circumference,
    a second tube closed at one end having the open end received in close sliding telescoped relation with the open end of the first tube,
    an arcuate wedge slidably received in complementary relation in the eccentric recess of the first tube to substantially define the internal circumference of said first tube, and
    means to slide the wedge in the groove out of complementary relationship whereby the tubes are wedged into a locked position.

3. In a telescopic carrying case the combination of
    a first elongated container closed on one end having a tapered recess on the internal surface thereof near the open end,
    a second elongated container closed on one end having the open end telescopically received within the first container, and
    a wedge received in sliding complementary relation to the internal recess of the first container and having an actuating portion extending externally of the first elongated container whereby movement of the actuating portion in a linear direction effects sliding of the wedge out of complementary relation with the recess to wedge between the first and second containers thereby limiting the telescopic movement of said first container with respect to said second container.

4. In a telescoping tubular container the combination of
    a first tube closed at one end, said tube having an eccentric recessed groove extending substantially 180° around the internal circumference of the first tube in adjacent relation to the open end of the first tube, and an extended substantially rectangular hole through the wall of said tube substantially smaller and centrally positioned with respect to the recessed groove,
    a second tube closed at one end having the other end receivable in telescoping relation into the open end of the first tube, at least one of said first and second tubes having breathing holes through the closed end thereof,
    an arcuate shaped wedge fitting in sliding complementary relation with said recessed groove,
    means to resiliently retain the wedge in the groove, and
    means extending through said hole operatively engaging said wedge to effect circumferential movement thereof relative to both tubes whereby the tubes are wedged into a locked relation to each other.

5. In a telescoping tubular container the combination of
    a first plastic tube closed at one end, said tube having an eccentric recessed groove extending partially around the internal circumference thereof in adjacent parallel relation to the open end of the first tube, and an extended substantially rectangular hole through the wall of said tube substantially smaller than and centrally positioned with respect to the recessed groove,
    a second plastic tube closed at one end having the other end receivable in telescoping relation into the open end of the first tube,
    an arcuate shaped plastic wedge fitting in sliding complementary relation with said recessed groove, and
    plastic means extending through said hole operatively engaging said wedge to effect circumferential movement thereof relative to both tubes whereby both tubes are wedged into a locked relation to each other.

6. In combination
    a first tube closed at one end,
    an open reinforcing cap secured to the open end of said first tube and having an internal eccentric recess adjacent and substantially parallel to the open end extending around at least a portion of the internal circumference,
    a second tube closed at one end having the open end received in close sliding telescoped relation with the open end of the cap and the first tube, an arcuate wedge slidably received in complementary relation in the eccentric recess of the cap to substantially redefine the internal circumference thereof, and means to slide the wedge in the groove out of complementary relationship whereby the tubes are wedged into a locked position.

References Cited

UNITED STATES PATENTS 2,749,153   6/1956   Baker.

JOSEPH R. LECLAIR, *Primary Examiner.*

JAMES B. MARBERT, *Examiner.*